UNITED STATES PATENT OFFICE.

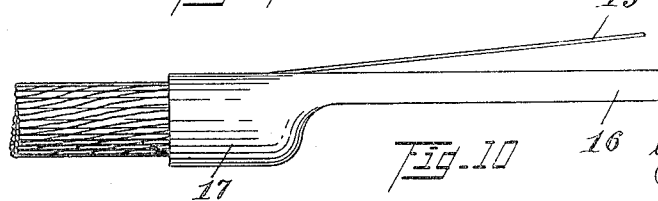

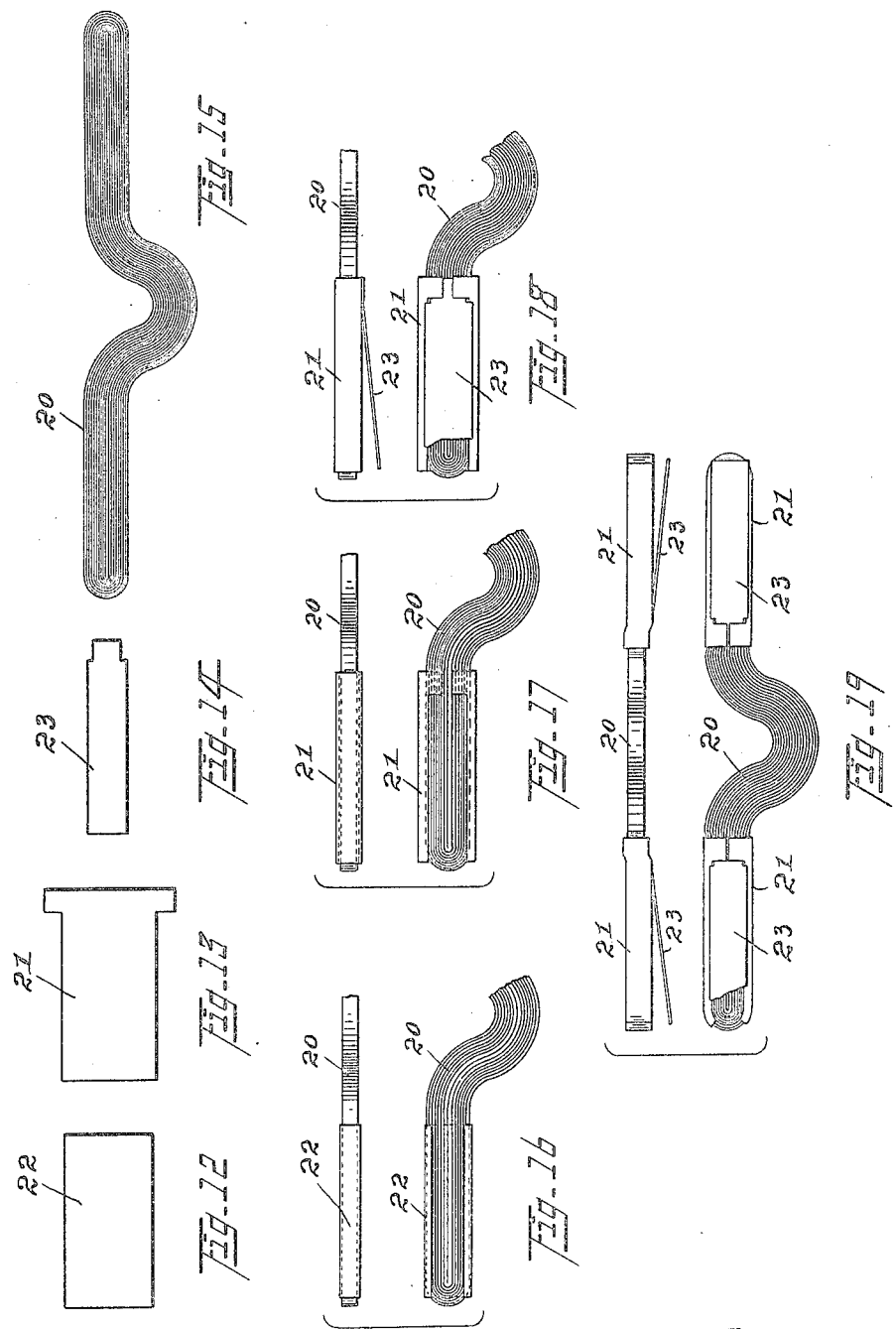

LAWRENCE P. CRECELIUS, OF CLEVELAND, OHIO, ASSIGNOR TO THE ELECTRIC RAILWAY IMPROVEMENT COMPANY, OF CLEVELAND, OHIO, A CORPORATION OF OHIO.

RAIL-BOND.

1,335,428.  Specification of Letters Patent.  Patented Mar. 30, 1920.

Application filed May 3, 1916. Serial No. 95,051.

*To all whom it may concern:*

Be it known that I, LAWRENCE P. CRECELIUS, a citizen of the United States, residing at Cleveland, in the county of Cuyahoga and State of Ohio, have invented a certain new and useful Improvement in Rail-Bonds, of which the following is a full, clear, and exact description.

This invention relates to rail bonds and has for one of its objects to provide a rail bond which can be made cheaply and which can be very effectively brazed to the rail so as to provide a joint which is satisfactory from both mechanical and electrical standpoints.

One of the more specific objects is to form the bond in such a way that both the conductor and terminal sleeve surrounding the conductor will be brazed to the rail when the bond is applied thereto by the brazing apparatus.

Another one of the more specific objects is to provide a bond so constructed that the conductor of the bond and the terminal sleeve are mechanically held or pressed together but in such a manner that when the bond is brazed to the rail by suitable means such as by an electric brazing machine including one or more heating electrodes, simultaneously the terminal sleeve is brazed to the conductor and both the conductor and terminal sleeve are brazed to the rail.

The invention may be briefly summarized as consisting in certain novel details of construction which will be described in the specification and set forth in the appended claims.

In the accompanying sheet of drawings, wherein I have shown two embodiments of my invention, Figure 1 is a portion of a stranded conductor which is provided at its ends with terminals designed to be brazed to track rails; Fig. 2 shows two side views and an end view of a terminal sleeve adapted to be secured to one end of the conductor; Fig. 3 is a side view and end view of a brazing sleeve which is placed between the terminal sleeve and the conductor; Fig. 4 is a face view of a strip of brazing material which is designed to be fastened to the terminal for the purpose of brazing the conductor and terminal sleeve to the rail; Fig. 5 is a view of the assembled conductor, terminal sleeve and brazing sleeve, the sleeves being shown in section; Fig. 6 is an end view of the same; Fig. 7 is a view similar to Fig. 5 after the strip of brazing material of Fig. 4 is applied; Fig. 8 is a view showing the assembled conductors and parts of the terminal about to be shaped and to be secured together; Fig. 9 is an enlarged face view of the completed terminal with the strip of brazing material removed; Fig. 10 is a side view of the completed terminal; Fig. 11 is an end view of the same. Figs. 12 to 15 are face views of parts which make up a modified form of bond, the parts shown in these figures corresponding respectively to the inner brazing sleeve, the outer terminal sleeve, the strip of brazing material and the main conductor of the bond shown in the preceding figures. Fig. 16 shows an edge and face view of the terminal portion of the bond after the inner brazing sleeve or strip has been applied thereto; Fig. 17 shows similar views after the outer terminal sleeve has been applied; Fig. 18 shows similar views after the strip of brazing material has been applied; and Fig. 19 shows respectively an edge view and a face view of the completed bond.

Referring first to Figs. 1 to 11 of the drawings, 10 represents a portion of the stranded conductor on the ends of which the terminals are adapted to be formed in the manner hereinafter described, and which in this instance is composed of a group of twisted wires. In forming the terminal I slip onto the end of the conductor 10 two concentric sleeves, including what I term an inner brazing sleeve 11 and an outer terminal sleeve 12, the terminal sleeve being preferably formed of copper and the inner sleeve 11 being preferably formed of brass or other material which melts at a lower temperature than the sleeve 12 and which will serve as a braze to braze the sleeve 12 to the conductor 10 when the terminal of the bond is brazed to the rail. It will be observed that the sleeve 11 is provided with an open gap 11$^a$ extending throughout its length and that the sleeve 12 is provided with a slot 12$^a$ extending the major portion of the length of the sleeve, and that when the sleeves are assembled on the end of the conductor 10 the gap 11$^a$ of the inner sleeve and the slot 12$^a$ of the outer sleeve register so that a portion of the conductor is exposed on one face or side of the terminal, as appears particularly from Figs. 5 and 6. It will be observed also that the inner brazing sleeve is somewhat shorter than the outer terminal sleeve 12, the former extending from the end of the conductor substantially to the end of the slotted portion 12ª of the terminal sleeve.

I next insert between the conductor and the circular or unslotted part of the outer sleeve, the end of a strip of brazing material 13 which melts at a lower temperature than the inner brazing sleeve 11, this strip 13 being arranged opposite the exposed part of the conductor, i. e., the part which is opposite or exposed through the gap in the two concentric sleeves. The parts are now as shown in Fig. 7.

To complete the terminal, the assembled parts are cold pressed between two dies 14 and 15 of a so-called bulldozer which shapes the terminal and fastens or secures the parts together. By fastening the parts together I mean that the elements are not forged together in the true sense of the term, but are merely pressed together in such a way that they will not accidentally slip off the end of the conductor. The dies of the bulldozer are so shaped that when the terminal is struck by the dies, the terminal is provided with a flattened portion 16 and with a hub 17 consisting of the substantially circular unslotted end of the terminal sleeve and the portion of the conductor 10 which extends through it. In flattening or shaping the terminal 16 there is formed a flat inner face 18 which is adapted to be brazed to the rail, this face being composed of a portion of the conductor 10 and the edge portions of the slotted terminal sleeve 12 which extends around the three sides of the flat terminal 16 and part way over the fourth side or inner face 18. This side or face 18 of the terminal is covered or overlaid by the projecting portion of the brazing strip 13, as shown in Figs. 10 and 11.

Although prior to brazing the bond to the rail the parts of the terminal are not integrally or intimately united, when the bond is brazed to a rail, preferably by electrical apparatus, including one or more high resistance heating electrodes which are designed to be pressed against the rear or outer flat face of the terminal 16, the brazing strip 13 will be melted, brazing both the conductor and the terminal sleeve to the rail and at the same time the inner brazing sleeve 11 which melts at a somewhat higher temperature than the brazing strip 13, but which is closer to the heating electrodes, and is, therefore, subjected to more heat than the brazing strip 13, melts and brazes the terminal sleeve to the conductor, thus forming a substantially solid body with both the conductor and the terminal sleeve intimately secured together and both intimately secured to the rail.

On Sheet 2 of the drawings I have shown a bond the conductor of which is of the ribbon type, and which is provided with terminals formed in the same manner as previously explained, this sheet of the drawings showing also the various stages or steps of the method of producing the bond. As shown in Fig. 15, the conductor 20 or main portion of the bond is formed of a plurality of layers of a ribbon or series of ribbons, which are preferably of copper, the layers being arranged face to face. For each terminal of the ribbon conductor shown in Fig. 15 I employ a terminal sleeve 21 which is preferably formed from a flat strip of copper or other suitable conducting material shown in Fig. 13, and an intervening strip or sleeve 22 of brazing material, such as brass, which is designed to braze the outer sleeve 21 to the ribbon conductor 20, this inner sleeve or layer of brazing material being preferably formed from a flat piece of metal shown in Fig. 12. Additionally, I employ a strip 23 of brazing material shown in Fig. 14, which, as in the first instance, is designed to braze to the rail both the conductor 20 and the outer terminal sleeve 21, and melts at a slightly lower temperature than the inner brazing sleeve. This brazing strip both with this bond and the one first described may consist of a brazing composition known in this art as "silver solder". In forming this bond the inner sleeve or brazing sleeve 22 and the outer sleeve or terminal sleeve 21 may be shaped up and separately applied to the terminal portion of the conductor 20, as illustrated in Figs. 16 and 17, or, if desired, the two concentric sleeves may be either separately or simultaneously shaped up and simultaneously applied to the conductor of the bond. However, for the sake of clearness, on Sheet 2 of the drawings I have shown these parts applied to the conductor of the bond by separate operations.

This bond shown in Sheet 2 of the drawings, is adapted to be applied to a rail in precisely the manner first described, the different parts functioning in the same way that the corresponding parts of the construction first described function.

With the bond shown both on Sheet 1 and Sheet 2 of the drawings, the brazing strip 13 in one instance and 23 in the other instance is fastened in position by having one end inserted beneath the outer or terminal sleeve. It is not essential, however, that this brazing strip be applied or attached in this manner but other ways of fastening it in position may be employed if desired, such for example, as riveting the strip to the terminal.

While I have illustrated two different forms or types of bonds made in accordance with my invention, I have not attempted to illustrate all the modifications or forms that the invention may assume, and I, therefore, do not desire to be confined to the exact details shown, but aim in my claims to cover all modifications which do not involve a departure from the spirit and scope of my invention.

Having described my invention, I claim:

1. A rail bond comprising a conductor and a terminal sleeve receiving one end of the conductor, said sleeve forming a permanent part of the terminal of the bond and normally superficially and non-intimately attached thereto, a portion of the conductor being exposed on one side of the sleeve whereby the conductor may be directly brazed to a rail, said sleeve adapted to be intimately attached to the conductor by brazing when the bond is brazed to the rail.

2. A rail bond, comprising a conductor, a terminal sleeve receiving the end of the conductor and normally superficially attached thereto and a layer of brazing material which melts at a lower temperature than the sleeve interposed between the terminal sleeve and the conductor and serving to unite the sleeve to the conductor when the bond is applied to a rail.

3. A rail bond, comprising a conductor, a terminal sleeve having a portion extending part way around the conductor and normally non-intimately attached thereto, and a layer of brazing material interposed between the terminal sleeve and the portion of the conductor which it surrounds, said sleeve having a higher melting temperature than the brazing material.

4. A rail bond, comprising a conductor having a terminal with a face adapted to be brazed to a rail, said terminal including a sleeve receiving the end of the conductor and normally superficially attached thereto with brazing material interposed between the conductor and sleeve and also arranged opposite the face adapted to be brazed to the rail, the sleeve having a higher melting temperature than the brazing material.

5. A rail bond, comprising a conductor having a terminal, including a sleeve into which the conductor extends and which is normally non-intimately attached to the conductor, a portion of the conductor being exposed through the sleeve, and brazing material interposed between the conductor and sleeve and also opposite the exposed portion of the conductor, the sleeve having a higher melting temperature than the brazing material.

6. A rail bond, comprising a conductor, having a terminal sleeve and two different pieces of brazing material of different melting points, one between the conductor and the sleeve and the other on the face of the terminal of the bond adapted to be brazed to the rail.

7. A rail bond, comprising a conductor having a terminal sleeve partly surrounding the conductor so that a portion of the latter is exposed at one side, and two pieces of brazing material, one arranged opposite the exposed portion of the conductor and the other having a higher melting point than the first and arranged between the sleeve and the conductor.

8. As an article of manufacture, a rail bond, comprising a conductor having a terminal portion adapted to be attached to a rail and two sleeves formed as a part of the bond and surrounding the same portion of the conductor, the inner sleeve having a lower melting temperature than the outer sleeve.

9. As an article of manufacture, a rail bond, comprising a conductor having a terminal portion adapted to be attached to a rail and two concentric sleeves formed as a part of the bond and fitted onto the same portion of the conductor, the inner sleeve having a lower melting temperature than the outer sleeve.

10. A rail bond, comprising a conductor having a terminal portion, two sleeves extending part way around the terminal portion so that a part of the latter is exposed through both sleeves, and a piece of brazing material opposite said exposed portion of the conductor.

11. A rail bond, comprising a conductor having a flattened terminal portion, a sleeve extending part way around the same, an inner sleeve likewise extending part way around the same, said inner sleeve having a lower melting temperature than the other sleeve.

12. A rail bond, comprising a conductor having a flattened terminal portion, a sleeve extending part way around the same, an inner sleeve likewise extending part way around the same, said inner sleeve having a lower melting temperature than the other sleeve, and a strip of brazing material of lower melting temperature than both said sleeves carried by the bond and arranged opposite the portion of the flattened terminal of the conductor which is not covered by said sleeves.

13. A rail bond, comprising a conductor having a flattened terminal portion, two concentric sleeves surrounding a portion of the flattened terminal so that another portion of the latter is exposed, the inner sleeve having a lower melting temperature than the outer sleeve, and a strip of brazing material of lower melting temperature than the inner sleeve opposite said exposed portion of the terminal.

14. As an article of manufacture, a rail bond comprising a flexible conductor and a terminal sleeve normally superficially attached to the conductor and forming a permanent part of the bond, said sleeve provided with a portion which entirely surrounds the conductor, and with another portion only partially surrounding the conductor, thereby leaving a face of the latter exposed so that it may be brazed to the rail, said portion of the sleeve which partially surrounds the conductor adapted to be brazed thereto when the bond is brazed to the rail.

15. As an article of manufacture, a rail bond composed of a conductor and a terminal strip pressed thereon and thereby non-intimately attached thereto, a portion of the strip being folded around the conductor at a point adjacent that part thereof which is to be brazed to the rail, and another portion of the strip partially surrounding the conductor whereby a face of the latter is exposed so that it may be brazed to the rail, said strip forming a permanent part of the bond and adapted to be brazed to the conductor when the latter is brazed to the rail.

16. As an article of manufacture, a rail bond consisting of a conductor having a terminal portion and a flexible portion extending therefrom, and a terminal member forming a permanent part of the bond and pressed onto the conductor and thereby superficially attached to the latter, said member having a portion substantially entirely surrounding the conductor adjacent the terminal portion thereof, and having a portion adapted to be brazed to said terminal portion and extending along one face thereof, the opposite face of said terminal portion being exposed whereby it may be brazed directly to the rail.

17. As an article of manufacture, a rail bond comprising a flexible, stranded conductor having a terminal portion, a terminal member forming a permanent part of the bond and having a portion superficially or non-intimately surrounding the conductor where it leaves the terminal portion, one face of the terminal portion of the conductor being exposed so that it may be brazed to a rail, and said terminal member having another portion superficially or non-intimately overlying another face of the terminal portion of the conductor and adapted to be brazed to such face when the terminal portion of the conductor is brazed to the rail.

In testimony whereof I hereunto affix my signature.

LAWRENCE P. CRECELIUS.